United States Patent
Reilly et al.

(10) Patent No.: US 6,861,129 B2
(45) Date of Patent: Mar. 1, 2005

(54) MAR RESISTANCE, NON-GLARE TRANSPARENT ACRYLIC SHEET WITH CONSISTENT OPTICAL PROPERTIES AT VARIOUS SHEET THICKNESSES

(75) Inventors: Jack J. Reilly, Blue Bell, PA (US); Jana Lamberson, York, PA (US); Gary Hall, Oaklyn, NJ (US); Thomas DeMain, Langhorne, PA (US)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 10/390,374

(22) Filed: Mar. 17, 2003

(65) Prior Publication Data

US 2004/0018349 A1 Jan. 29, 2004

Related U.S. Application Data

(60) Provisional application No. 60/368,076, filed on Mar. 26, 2002.

(51) Int. Cl.[7] .............................. B32B 7/02; B32B 27/30
(52) U.S. Cl. ....................... 428/215; 428/213; 428/327; 428/332; 428/335; 428/520; 428/522
(58) Field of Search ................................. 428/213, 215, 428/327, 332, 335, 520, 522

(56) References Cited

U.S. PATENT DOCUMENTS

| | | | |
|---|---|---|---|
| 4,876,311 A | | 10/1989 | Hennig et al. ............... 525/229 |
| 6,309,739 B1 | * | 10/2001 | Koizumi et al. ............. 428/220 |
| 6,692,821 B2 | * | 2/2004 | Koyama et al. ............. 428/213 |
| 6,696,140 B2 | * | 2/2004 | Suzuki ........................ 428/212 |
| 2002/0027626 A1 | | 3/2002 | Hiraishi et al. ............. 349/112 |

FOREIGN PATENT DOCUMENTS

| | | |
|---|---|---|
| EP | 0 497 506 | 1/1992 |
| EP | 1022115 | 1/2000 |
| JP | 11170449 | 6/1999 |

* cited by examiner

*Primary Examiner*—D. S. Nakarani
(74) *Attorney, Agent, or Firm*—Thomas F. Roland; Gilbert W. Rudman

(57) ABSTRACT

Disclosed is a mar resistant transparent co-extruded sheet which is comprised of (a) a cap layer containing particles having a mean particle size of about 1 to 60 microns wherein 90% of the particles are less than 70 microns, at a loading of 0.1 to 18%, melt blended with an acrylic matrix, wherein the particle and matrix have refractive indices within 0.020 units when measured in conformance with ASTM D 542; and (b) a clear substrate layer comprised of an acrylic composition, wherein the substrate has a refractive index within 0.020 units of the refractive index of the cap layer matrix when measured in conformance with ASTM D 542; wherein the co-extruded product has (i) a luminous transmission (CIE tristimulus Y value) of greater than 90% when measuring spectral transmission data using a Macbeth® Color-Eye® 7000 spectrophotometer (Division of Kollmorgen Instruments Corporation), Illuminant C, and the 2° standard observer, and calculating the CIE tristimulus Y value in conformance with ASTM E 308, and (ii) a haze of less than 16% when measured in conformance with ASTM D 1003, and at least one of (iii) or (iv), (iii) a 60° gloss value measured on a 0.118 inch thick sample within 15 units of the 60° gloss value measured on a 0.080 inch thick sample when measured using a micro-TRI-gloss meter made by BYK-Gardner GmbH in conformance with ASTM D 523 using a black felt backing, and (iv) a change in haze as measured in conformance with ASTM D 1044, after 500 revolutions using a 500 g load and CS10F wheel, of less than 25%.

11 Claims, No Drawings

US 6,861,129 B2

MAR RESISTANCE, NON-GLARE TRANSPARENT ACRYLIC SHEET WITH CONSISTENT OPTICAL PROPERTIES AT VARIOUS SHEET THICKNESSES

REFERENCE TO RELATED APPLICATION

This application claims the benefit of U.S. Provisional Application Ser. No. 60/368,076, filed Mar. 26, 2002.

BACKGROUND OF THE INVENTION

1. Field of the Invention

This invention relates to a transparent co-extruded acrylic sheet having use as mar resistant, non-glare picture frame covers and for other purposes.

2. Prior Art

The most common materials used in picture frame cover applications are glass and acrylic. Within each of these classes of materials there are standard frame materials that are glossy and there are specialty frame materials that are non-glare or less glossy.

The standard glass covers include standard plate glass or window glass and these materials are quite commonly used in these applications. The standard acrylic picture frame covers are also commonly used and examples of these include Plexiglas® MC (an extruded and melt calendered acrylic sheet comprised of a MMA/EA copolymer having a melt flow rate of about 2 g/10 minutes when measured in conformance with ASTM D 1238, Condition 230° C./3.8 kg, procedure A) and Plexiglas® UF—5(an extruded and melt calendered acrylic sheet comprised of a MMA/EA copolymer having a melt flow index of about 2 g/10 minutes when measured in conformance with ASTM D 1238, Condition 230° C./3.8 kg, procedure A; wherein a substantially higher amount of an ultraviolet filtering agent is added) sheet products.

However, a deficiency of each of these products is that they are glossy. Hence, it is common to see reflections (particularly from overhead lighting) when viewing the images protected by these types of picture frame covers. To overcome this deficiency, both glass and acrylic manufacturers typically impart a very fine pattern onto the outside surface of the picture frame cover. The patterned surface reduces the specular reflections or gloss by scattering the light. This reduces the glare on the protective cover.

Even though the concept of imparting a pattern onto the surface to achieve a non-glare finish is shared by both glass and acrylic manufacturers, the approach to achieve it is very different. Typically, glass manufacturers etch the surface of the glass with an aggressive acid in order to achieve the desired texture. Whereas, the state-of-the-art for producing plastic non-glare picture frame covers is via the sheet extrusion process where an embossing roll is used to impart a non-glare pattern into the molten polymer extrudate as it is being polished and cooled into sheet.

An example of this type of product is Plexiglas® Non-Glare sheet (an extruded and melt calendered acrylic sheet comprised of a MMA/EA copolymer having a melt flow rate of about 2 g/10 minutes when measured in conformance with ASTM D 1238, Condition 230° C./3.8 kg, procedure A); wherein an embossing roll is used to mechanically impart a pattern onto the surface of the sheet on-line during the polishing steps.

However, this embossing technology in the sheet extrusion process has several shortcomings:

1. The extrusion line needs to be shut down in order to change one of the polishing rolls from a typically used highly polished chrome roll used to produce standard products such as Plexiglas® MC sheet to a patterned roll typically used for a specialty product such as Plexiglas® Non-Glare sheet.

2. The degree of non-glare or gloss of the resultant Plexiglas® Non-Glare sheet changes dramatically for each sheet thickness produced. Typically with this embossing technology, a much higher gloss results on the thicker gauge sheet. This is because the thicker sheet retains the heat necessary to extrude or melt calendar the material for a much longer period of time. Consequently, after the sheet has been embossed with the pattern, the thicker gauge sheet tends to relax more and deviate more from the original embossed pattern.

The mar resistance properties of extruded acrylic sheet is a deficiency especially when compared to glass. Abrasion resistant coatings may be used to help improve this property but this added processing step is quite expensive. An example of this type of product is Acrylite® AR (a melt processed acrylic sheet comprised of MMA/MA composition which has an abrasion resistant hardcoat applied onto the surfaces) which is commercially available from Cyro Industries.

The present invention enables an acrylic sheet to be economically produced using a co-extrusion process wherein:

1. The line does not need to be shut down to change from a highly polished sheet product to a specialty non-glare sheet product.

2. The gloss properties of the resultant sheet at various thicknesses are much more consistent when compared with sheet produced using the embossing technology.

3. The mar resistance properties of the resultant sheet are improved compared to typically extruded acrylic sheet product all in one processing step.

SUMMARY OF THE INVENTION

This invention relates to a mar resistant transparent co-extruded sheet having an overall thickness of 0.04 to 0.25 inches thick, preferably 0.05 to 0.18 inches thick, comprised of:

(a) a cap layer, preferably 0.001 to 0.025 inches thick, containing
  (i) particles, preferably spherical, having a mean particle size of about 1 to 60 microns, preferably 10–40 microns and most preferably 20–35 microns, wherein 90% of the particles are less than 70 microns preferably less than 50 microns, and most preferably less than 40 microns, at a loading of 0.1 to 18%, preferably 0.5 to 12%, with the acrylic matrix, preferably the particles are comprised of a polymer or copolymer of methyl methacrylate (MMA) with a crosslinking agent; preferably comprised of 80–99% MMA and 1–20%, preferably 1–5%, of (C1–C10) alkyl acrylates, such as methyl acrylate (MA) and ethyl acrylate (EA), more preferably, the particle is 90–98% MMA, 2–10% EA, and 0.01–5% crosslinking agent; most preferred is 95–97% MMA, 3–5% EA, and 0.01–2% crosslinking agent, melt blended with
  (ii) an acrylic matrix, wherein the particle and matrix have refractive indices within 0.020 units, preferably within 0.005 units, when measured in conformance with ASTM D 542; and (b) a clear substrate layer comprised of an acrylic composition, wherein the substrate has a refractive index within 0.020 units, preferably within 0.010 units, of the refractive index of the cap layer matrix when measured in conformance with ASTM D 542; and wherein the co-extruded product has properties (i), (ii) and at least one of properties (iii) or (iv), preferably all four:

(i) luminous transmission (CIE tristimulus Y value) of greater than 90%, preferably more than 91%, when measuring spectral transmission data using a Macbeth Color-Eye 7000 spectrophotometer (Division of Kollmorgen Instruments Corporation), Illuminant C, and the 2 standard observer, and calculating the CIE tristimulus Y value in conformance with ASTM E 308, which measures the amount of light transmitted through the sheet;

(ii) haze of less than 16%, preferably less than 12%, when measured in conformance with ASTM D 1003, which is a measurement of optical clarity, or;

(iii) 60° gloss values measured on two different sheet thicknesses within the range of 0.04 to 0.25 inches thick, preferably on a 0.118 inch thick sample sheet and 0.080 inch thick sample sheet, which are within 15 units of each other, preferably within 10 units, when measured using a micro-TRI-gloss meter made by BYK-Gardner GmbH in conformance with ASTM D 523 using a black felt backing, which is a measure of specular reflection, i.e., the consistency of optical properties at various thicknesses; and (iv) a change in haze as measured in conformance with ASTM D 1044, after 500 revolutions using a 500 g load and CS10F wheel, of less than 25%, preferably less than 22%, which is a measure of mar resistance.

DETAILED DESCRIPTION OF THE INVENTION

The cap layer of the present invention contains particles which have been melt blended with an acrylic matrix. The thickness of the cap layer is 0.001 to 0.025 inches thick, preferably 0.002 to 0.010 inches thick.

The particles are cross-linked and may be made by a suspension process. The composition of the particles may be alkyl methacrylate homo polymers, or copolymers of alkyl methacrylates with other alkyl methacrylates or alkyl acrylates or other ethylenically unsaturated monomers, with a crosslinking agent.

The alkyl group can be from 1–18 carbon atoms, preferably 1–4 carbon atoms. Preferred are polymethyl methacrylate based polymers and copolymers of methyl methacrylate with from about 0.1%–20% alkyl acrylates, wherein the alkyl contains 1–4 carbon atoms, alkyl acrylic acids wherein alkyl contains 1–18 carbon atoms.

Preferably the crosslinked particle comprises a polymer or copolymer of methyl methacrylate (MMA) with a crosslinking agent; typical copolymers include 80–99% MMA and 1–20%, preferably 1–5%, of (C1–C10) alkyl acrylates, such as methyl acrylate (MA) and ethyl acrylate (EA).

More preferably, the particle is 90–98% MMA, 2–10% EA, and 0.01–5% crosslinking agent; most preferred is 95–97% MMA, 3–5% EA, and 0.01–2% crosslinking agent.

Crosslinking monomers suitable for use as in the spherical polymer particles (beads) are well known to those skilled in the art, and are generally monomers copolymerizable with monomers present, and having at least two or more unsaturated vinyl groups which have approximately equal or different reactivities, such as divinyl benzene, glycol di- and tri-methacrylate, and acrylates, ethylene glycol dimethacrylate, allyl methacrylates, diallyl maleate, allyl acryloxypropionates, butylene glycol diacrylates, etc.

Preferred crosslinkers are ethylene glycol dimethacrylate, divinyl benzene, and allyl methacrylate. Most preferred is allyl methacrylate.

The particles, which preferably are spherical, have a mean particle size of about 1 to 60 microns, preferably 10–40 microns and most preferably 20–35 microns, wherein 90% of the particles are less than 70 microns, preferably less than 50 microns, and most preferably less than 40 microns.

The acrylic matrix used in the cap layer can be:

1. alkyl methacrylate homo polymers,
2. copolymers of alkyl methacrylates with other alkyl methacrylates or alkyl acrylates or other ethylenically unsaturated monomers,
3. alkyl acrylate homo polymers, and
4. copolymers of alkyl acrylates with other alkyl acrylates or alkyl methacrylates or other ethylenically unsaturated monomers.

The alkyl group can be from 1–18 carbon atoms, preferably 1–4 carbon atoms. Preferred are polymethyl methacrylate based matrix and copolymers of methyl methacrylate with from about 0.1%–20% alkyl acrylates, wherein the alkyl contains 1–4 carbon atoms, alkyl acrylic acids wherein alkyl contains 1–18 carbon atoms.

Preferably the thermoplastic matrix material comprises a polymer or copolymer of methyl methacrylate (MMA); typical copolymers include 80–99% MMA and 1–20%, preferably 1–5%, of (C1–C10) alkyl acrylates, such as methyl acrylate (MA) and ethyl acrylate (EA). Suitable commercially available poly(methyl methacrylate) type thermoplastic matrix materials include is Plexiglas® V(825), V(825) HID, V(046), V(045), V(052), V(920), etc.

More preferably, the matrix is 90–98% MMA and 2–10% EA, most preferred is about 95–97% MMA and about 3–5% EA.

The polymer matrix is conveniently prepared by conventional cell casting or melt extrusion processes and is typically provided in particulate form. In addition, thermoplastic matrix materials may be prepared by a conventional bulk process (for example, a continuous flow stirred tank reactor (CFSTR process), solution, suspension or emulsion polymerization techniques, in which case conventional isolation processes used to recover the polymer in particulate form include, for example, filtration, coagulation and spray drying.

The matrix may also include other modifiers or additives which are well known in the art. For example, the composition may contain impact modifiers, external lubricants, antioxidants, flame retardants or the like. If desired, ultraviolet stabilizers, flow aids, and anti-static agents may also be added.

The materials used to produce the bead and matrix have a refractive index of 1.48–1.50, when measured in conformance with ASTM D 542, but in order to produce the transparent sheet desired in the present invention, they must have refractive indices within 0.020 units of each other, preferably within 0.005 units, when measured in conformance with ASTM D 542.

The cap layer may be produced by melt blending the particles, at a loading of 0.1 to 18%, preferably 0.5 to 12%, with the acrylic matrix.

While melt blending is well known in the industry, one example of the process for producing an article of the present invention is as follows:

The acrylic resin is dried in a dehumidifying, forced hot air oven before being compounded with the crosslinked particles through, for example, a single-screw extruder equipped with a 2-stage, medium work screw and a vacuum venting system. A twin screw extruder equipped with a vacuum venting system may also be used for the compounding. The particles, the polymer matrix resin, and additives are added into the feed hopper of the extruder using separate feeders. The conveyer system for the beads should be a closed system to avoid safety and dust hazards. The particles are metered into the feed hopper of the extruder using a feeder equipped with an auger screw by gravimetric control or by volumetric feeding control. The temperature profile which can be used for making the cap layer resin when the composition contains 0.1–18% suspension beads and 82–99.9% acrylic made by a free radical polymerization process, can be as follows:

Typical process conditions for a single screw, compounding extruder are listed below:

| Extruder Conditions | Conditions |
| --- | --- |
| Barrel Zone 1: | 225–240° C. |
| Barrel Zone 2: | 235–255° C. |
| Barrel Zone 3: | 245–260° C. |
| Screw Speed: | 60–100 RPM (revolutions per minute) |

The continuously-produced extrudate is cooled by running the strand through a water bath and subsequently cutting it into cap layer resin pellets. This cap layer resin is oven dried before further usage.

The inventors have found that the bead size and bead loading level in the cap layer both influence the degree of surface roughness. Typically, the higher the surface roughness, the lower the degree of glare or specular reflection. However, light scattering may also occur due to refractive index mismatches between the beads and the cap layer matrix material. This light scattering typically increases the haze of the sheet. Even when the refractive index of the beads is closely matched to that of the matrix, there may be some contribution to haze due to very minor mismatches in the refractive indices between the crosslinked beads and the acrylic matrix material. This is why the cap layer thickness is important to control and minimize so that the optical quality (high transmission and low haze) is optimized for transparent applications.

The clear substrate layer is comprised of the same type of acrylic material as described for the cap layer acrylic matrix. The composition used in the substrate layer can be the same or different as the composition of the cap layer matrix so long as the refractive index of the compositions are within 0.020 units, but preferably identical to the cap layer matrix.

The co-extruded product may be produced by a co-extrusion process comprised of two or more extruders converting plastic resin materials into molten plastic. Typically, there is a minimum of a primary extruder and a secondary extruder, but there may also be additional extruders, such as a tertiary extruder, etc. The primary extruder is usually the largest extruder and has the highest throughput rate compared to the other individual extruder(s). Therefore, in a 2-layer sheet configuration, the resin used to comprise the substrate or thicker layer is typically fed into the primary extruder and the cap layer resin used to comprise the cap or thinner layer is typically fed into the secondary extruder when using a co-extrusion set-up consisting of 2 extruders. Each of these extruders converts the resins fed to them into molten polymer, separately. The melt streams are then combined typically in a feedblock system or in a multi-manifold die set-up. In the feedblock system, there is a plug that is installed that determines how these 2 molten plastics will be layered in the final sheet. Hence, the polymer melt streams enter into the feedblock separately and are selectively combined within the feedblock. For a 2-layer sheet configuration, the cap layer may be located on either the top or bottom side of the substrate layer. Once the plastic melt streams are selectively layered and co-mingled in the feedblock, the combined melt stream exits the feedblock and enters the die where the combined melt stream is spread to the width of the die. The molten plastic extrudate is then polished between highly polished chrome-plated, temperature-controlled rolls. These rolls polish and cool the sheet to the desired overall thickness. Note that a multi-manifold die may also be used to achieve a layered sheet instead of a feedblock system. The polymer melt streams enter into the multi-manifold die separately and are selectively combined and spread to the width of the die all within the multi-manifold die.

Typical process conditions for 2-layer, sheet co-extrusion using a primary and secondary extruders and a feedblock/die assembly are listed below:

| Primary Extruder | Conditions |
| --- | --- |
| Barrel Zones: | 199–244° C. |
| Screw Speed: | 50–85 RPM (revolutions per minute) |
| Secondary Extruder | Conditions |
| Barrel Zones: | 221–255° C. |
| Screw Speed: | 10–20 RPM (revolutions per minute) |
| Feedblock | Temperature |
| Zones: | 232–260° C. |
| Die | Temperature |
| Zones | 221–281° C. |
| Polishing Rolls | Temperature |
| All | 80–95° C. |

Overall thickness of the sheet of the present invention can be 0.04 to 0.25 inches thick, preferably 0.05 to 0.18 inches thick.

The sheet of the present invention will have the following characteristics:

(a) luminous transmission (CIE tristimulus Y value) of greater than 90% when measuring spectral transmission data using a Macbeth® Color-Eye® 7000 spectrophotometer (Division of Kollmorgen Instruments Corporation), Illuminant C, and the 2° standard observer, and calculating the CIE tristimulus Y value in conformance with ASTM E 308, which is a measure of the amount of light transmitted through the sheet;

(b) haze of less than 16% when measured in conformance with ASTM D 1003, which is a measurement of optical clarity;

(c) 60° gloss values measured on two different sheet thicknesses within the range of 0.04 to 0.25 inches thick, preferably on a 0.118 inch thick sample sheet and 0.080 inch thick sample sheet, which are within 15 units of each other when measured using a micro-TRI-gloss meter made by BYK-Gardner GmbH in conformance with ASTM D 523 using a black felt backing, which is a measure of specular reflection, i.e., the consistency of optical properties at various thicknesses; and (d) change in haze as measured in conformance with ASTM D 1044, after 500 revolutions using a 500 g load and CS10F wheel, of less than 25%, which is a measure of mar resistance.

Uses for these compositions are in Point-of-Purchase (POP) displays, protective sign covers (particularly edge-lit signs), menu holders, picture frame covers, etc. where good optical quality coupled with non-glare properties are desired. Additionally, since these co-extruded compositions retain their non-glare surface characteristics better than prior art materials after heat bending, uses for these compositions may extend into heat-bent and thermoforming applications.

It is within the inventive concept hereof, that if a transparent sheet is not sought, but only a sheet that has the other characteristics of the sheet of the present invention, i.e., high luminous transmission, and mar resistance, that objective could be achieved by using materials in the co-extruded sheet that have a refractive indices which differ by greater that 0.020 units.

The present invention will now be described in detail with reference to the following examples that by no means limit the scope of the invention.

EXAMPLES

Preparation of a cap layer. Crosslinked beads comprised of a 96% methyl methacrylate/4% ethyl acrylate copolymer with allyl methacrylate used as the crosslinking agent, that are substantially spherical, having a mean particle diameter of about 10 to 32 microns, wherein 90% of the particles by weight are less than 40 microns in diameter, and a refractive index ($n_D$) of 1.4907 were melt blended into an acrylic molding resin (methyl methacrylate/ethyl acrylate 96/4) at 2, 5, 7.5 and 20% by weight. The refractive index ($n_D$) of the acrylic molding resin used above was measured as 1.4935 in conformance with ASTM D 542. Hence the refractive index of the bead is very similar compared to that of the acrylic matrix.

Preparation of the clear substrate layer and co-extruded sheet. The above described cap layer resin was fed into a secondary extruder. The same acrylic resin that was used as the matrix of the cap layer resin (methyl methacrylate/ethyl acrylate 96/4) was fed separately into the primary extruder.

A co-extrusion setup was used whereby the melt streams from each of these extruders was fed to a feedblock/die assembly where the melts were layered and spread to the width of the die. The layered extrudate was subsequently polished between a series of polishing rolls to yield 0.118 inch thick sheet with a smooth, glossy finish on 1 side and a non-glare surface on the other side. Cap layer thicknesses in the range of 0.002 to 0.010 inches seemed to yield the best balance of properties.

Measurement of Properties. Transmission spectra were measured using a Macbeth® Color-Eye® 7000 spectrophotometer (Division of Kollmorgen Instruments Corporation) using Illuminant C and a 2° observer. The equipment was calibrated in transmission mode using barium sulfate standard. CIE tristimulus Y values were calculated in conformance with ASTM E 308 and used as a measure of luminous transmission. Haze properties were measured in conformance with ASTM D 1003. Specular gloss properties were measured at angles of 20°, 60°, and 85° using a micro-TRI-gloss meter made by BYK-Gardner GmbH in conformance with ASTM D 523 using a black felt backing. The gloss meter was calibrated using a black glass standard and readings of 92.6, 95.5 and 99.5 were obtained at angles of 20°, 60° and 85°, respectively.

A summary of optical properties for various samples produced by the above methods are shown at the bottom of Table I.

The commercial materials listed in Table I are sold by ATOGLAS division of ATOFINA Chemicals, Inc. Plexiglas® MC (highly polished) and Plexiglas® Non-Glare (embossed) acrylic sheet have the same MMA/EA composition as described under prior art. The primary difference is that Plexiglas MC has very smooth and glossy surfaces whereas, the Plexiglas Non-Glare sheet has one smooth and glossy surface and one embossed, non-glare surface.

One feature of the present invention is that more consistent optical properties are obtainable at various thicknesses. (i.e., the 60° gloss of Plexiglas Non-Glare is 87.2 for 0.080 inch thick sheet and 118.4 for 0.118 inch thick sheet; whereas for the samples with 2% beads in the cap layer, the 60° gloss is 95.0 for 0.080 inch thick sheet and 90.6 for 0.118 inch thick sheet.)

TABLE I

Optical Properties of Non-Glare Sheets

| Sheet Material | Thickness (inches) | Transmission (%) | Haze (%) | Gloss 20° | Gloss 60° | Gloss 85° |
|---|---|---|---|---|---|---|
| Plexiglas ® Non Glare | 0.060 | 91.7 | 12.1 | 35.9 | 64.8 | 75.5 |
| Plexiglas ® Non Glare | 0.080 | 91.9 | 3.0 | 58.6 | 87.2 | 86.4 |
| Plexiglas ® Non Glare | 0.118 | 92.2 | 0.5 | 106.7 | 118.4 | 98.3 |
| Plexiglas ® MC | 0.118 | 92.1 | 0.8 | 134.3 | 127.1 | 106.9 |
| 2% beads in cap layer | 0.080 | 92.2 | 5.6 | 78.9 | 95.0 | 70.8 |
| 2% beads in cap layer | 0.118 | 92.1 | 5.3 | 72.8 | 90.6 | 69.4 |
| 2% beads in cap layer | 0.177 | 91.8 | 5.2 | 68.6 | 85.0 | 68.2 |
| 5% beads in cap layer | 0.118 | 92.2 | 14.6 | 21.2 | 44.4 | 31.3 |
| 7.5% beads in cap layer | 0.118 | 92.8 | 15.3 | 28.1 | 52.5 | 46.4 |
| 20% beads in cap layer | 0.118 | 92.7 | 53.7 | 3.7 | 14.4 | 10.0 |

Another feature of the present invention is an improvement in mar resistance of the picture frame cover compared to both standard polished (Plexiglas® MC) or embossed (Plexiglas® Non-Glare) sheet products. Note that the composition of these two products is the same, the primary difference between them is the surface finish. Table II shows data measured on 0.118 inch thick sheet samples.

TABLE II

Change in Haze Measured After 500 cycles of Taber Abrasion*

| | Delta Haze (%) |
|---|---|
| Plexiglas ® MC | 28.4 |
| Plexiglas ® Non-Glare | 27.8 |
| 2% beads in cap layer | 21.7 |
| 5% beads in cap layer | 13.6 |
| 7.5% beads in cap layer | 11.4 |

*ASTM D-1044, 500 g load, CS10F wheel.

What is claimed is:

1. A mar resistant transparent co-extruded sheet, comprised of:
a cap layer containing particles having a mean particle size of about 1 to 60 microns wherein 90% of the particles are less than 70 microns, at a loading of 0.1 to 18%, melt blended with an acrylic matrix, wherein the particle and matrix have refractive indices within 0.020 units when measured in conformance with ASTM D 542; and a clear substrate layer comprised of an acrylic composition, wherein the substrate has a refractive index within 0.020 units of the refractive index of the cap layer matrix when measured in conformance with ASTM D 542; and wherein the co-extruded product has
  (i) a luminous transmission (CIE tristimulus Y value) of greater than 90% when measuring spectral transmission data using a spectrophotometer and the 2° standard observer, and calculating the CIE tristimulus Y value in conformance with ASTM E 308, and
    (i) a haze of less than 16% when measured in conformance with ASTM D 1003;
    and at least one properly selected from (iii) or (iv),
    (ii) 60° gloss values measured on two different sheet thicknesses within the range of 0.04 to 0.5 inches thick which are within 15 units of each other when measured using a micro-TRI-gloss meter in conformance with ASTM D 523 using a black felt backing, and
    (iii) a change in haze as measured in conformance with ASTM D 1044, after 500 revolutions using a 500 g load and CS10F wheel, of less than 25%.

2. The sheet of claim 1 wherein the particles of the capcoat are cross-linked and are comprised of alkyl methacrylate homo polymers, or copolymers of alkyl methacrylates with other alkyl methacrylates or alkyl acrylates or other ethylenically unsaturated monomers.

3. The sheet of claim 2 wherein the particles are comprised of a polymer or copolymer of methyl methacrylate and a (C1–C10) alkyl acrylates.

4. The sheet of claim 3 wherein the particles are comprised of a copolymer of 80–99% methyl methacrylate, and 1–20% ethyl acrylate.

5. The sheet of claim 3 wherein the particles are comprised of a copolymer of 90–98% methyl methacrylate and 2–10% ethyl acrylate.

6. The sheet of claim 1 wherein the acrylic matrix of the cap layer is selected from the group comprising;
  i) alkyl methacrylate homo polymers,
  ii) copolymers of alkyl methacrylates with other alkyl methacrylates or alkyl acrylates or other ethylenically unsaturated monomers,
  iii) alkyl acrylate homo polymers, and
  iv) copolymers of alkyl acrylates with other alkyl acrylates or alkyl methacrylates or other ethylenically unsaturated monomers.

7. The sheet of claim 1 wherein clear substrate is comprised of a composition selected from the group comprising:
  i) alkyl methacrylate homo polymers,
  ii) copolymers of alkyl methacrylates with other alkyl methacrylates or alkyl acrylates or other ethylenically unsaturated monomers,
  iii) alkyl acrylate homo polymers, and
  iv) copolymers of alkyl acrylates with other alkyl acrylates or alkyl methacrylates or other ethylenically unsaturated monomers.

8. The sheet of claim 1 having an overall thickness of 0.05 to 0.18 inches thick, comprised of:
  (a) a cap layer, 0.001 to 0.025 inches thick, containing
    (i) spherical particles, having a mean particle size of at 20–35 microns, wherein 90% of the particles are less then 40 microns, at a loading of 0.5 to 12%, with an acrylic matrix, the particles are comprised of a polymer or copolymer of 80–99% methyl methacrylate, 1–5% methyl acrylate or ethyl acrylate with a crosslinking agent; melt blended with
    (ii) an acrylic matrix,
  wherein the particle and matrix have refractive indices within 0.020 units, preferably within 0.005 units, when measured in conformance with ASTM D 542; and
  (b) a clear substrate layer comprised of an acrylic composition, wherein the substrate has a refractive index within 0.010 units, of the refractive index of the cap layer matrix when measured in conformance with ASTM D 542; and
wherein the co-extruded product has
  (i) luminous transmission (CIE tristimulus Y value) of greater than 91%, when measuring spectral transmission data using a spectrophotometer and the 2° standard observer, and calculating the CIE tristimulus Y value in conformance with ASTM E 308;
    2. haze of less than 12%, when measured in conformance with ASTM D 1003;
  and at least one of
  (iii) 60° gloss values measured on two different sheet thicknesses within the range of 0.04 to 0.25 inches thick which are within 15 units of each other when measured using a micro-TRI-gloss meter in conformance with ASTM D 523 using a black felt backing; and
  (iv) change in haze as measured in conformance with ASTM D 1044, after 500 revolutions using a 500 g load and CS10F wheel, of less than 22%.

9. The sheet of claim 8 wherein the acrylic matrix of the cap layer is selected from the group comprising:
  i) alkyl methacrylate homo polymers.
  ii) copolymers of alkyl methacrylates with other alkyl methacrylates or alkyl acrylates or other ethylenically unsaturated monomers,
  iii) alkyl acrylate homo polymers, and
  iv) copolymers of alkyl acrylates with other alkyl acrylates or alkyl methacrylates or other ethylenically unsaturated monomers.

10. The sheet of claim 9 wherein clear substrate is comprised of a composition selected from the group comprising:
  i) alkyl methacrylate homo polymers,
  ii) copolymers of alkyl methacrylates with other alkyl methacrylates or alkyl acrylates or other ethylenically unsaturated monomers,
  iii) alkyl acrylate homo polymers, and
  iv) copolymers of alkyl acrylates with other alkyl acrylates or alkyl methacrylates or other ethylenically unsaturated monomers.

11. A polished transparent co-extruded sheet, 0.04 to 0.25 inches thick, comprised of:
  a cap layer, 0.001 to 0.025 inches thick containing particles having a mean particle size of about 10 to 32 microns wherein 90% of the particles are less than 40 microns, at a loading of 0.1 to 18% melt blended with an MMA/EA acrylic matrix, wherein the particle and matrix have refractive indices within 0.005 units of each other when measured in conformance with ASTM D 542; and
  a clear layer of an acrylic substrate of MMA/EA, wherein the substrate has a refractive index within 0.005 units of the refractive index of the cap layer matrix when measured in conformance with ASTM D 542;

wherein the co-extruded product 1. a luminous transmission (CIE tristimulus Y value) of greater than 90% when measuring spectral transmission data spectrophotometer and the 2° standard observer, and calculating the CIE tristimulus Y value in conformance with ASTM E 308, and (ii) a haze of less than 16% when measured in conformance with ASTM D 1003;

and at least one property selected from (iii) or (iv), a 60° gloss value measured on a 0.118 inch thick sample within 15 units of the 60° gloss value measured on a 0.080 inch thick sample when measured using a micro-TRI-gloss meter in conformance with ASTM D 523 using a black felt backing, and (iv) a change in haze as measured in conformance with ASTM D 1044, after 500 revolutions using a 500 g load and CS10F wheel, of less than 25%.

* * * * *